(12) United States Patent
Holligan et al.

(10) Patent No.: US 12,205,767 B2
(45) Date of Patent: Jan. 21, 2025

(54) CAPACITOR HEADER

(71) Applicant: FIRST LIGHT FUSION LIMITED, Yarnton (GB)

(72) Inventors: Paul Holligan, Yarnton (GB); James Parkin, Yarnton (GB); Jamie Darling, Yarnton (GB)

(73) Assignee: FIRST LIGHT FUSION LIMITED, Yarnton (GB)

( * ) Notice: Subject to any disclaimer, the term of this patent is extended or adjusted under 35 U.S.C. 154(b) by 371 days.

(21) Appl. No.: 17/794,477

(22) PCT Filed: Jan. 22, 2021

(86) PCT No.: PCT/GB2021/050143
§ 371 (c)(1),
(2) Date: Jul. 21, 2022

(87) PCT Pub. No.: WO2021/148799
PCT Pub. Date: Jul. 29, 2021

(65) Prior Publication Data
US 2023/0060632 A1 Mar. 2, 2023

(30) Foreign Application Priority Data
Jan. 24, 2020 (GB) ...................................... 2001050

(51) Int. Cl.
*H01G 4/224* (2006.01)
*H01G 4/248* (2006.01)
(52) U.S. Cl.
CPC ............. *H01G 4/224* (2013.01); *H01G 4/248* (2013.01)
(58) Field of Classification Search
CPC ................................ H01G 4/224; H01G 4/248
(Continued)

(56) References Cited

U.S. PATENT DOCUMENTS 6,051,796 A 4/2000 Kuhl et al.
6,282,078 B1 * 8/2001 Tsai .......................... H01G 9/28
361/306.1
(Continued)

FOREIGN PATENT DOCUMENTS

CN 1604248 A 4/2005
CN 105304323 A 2/2016
(Continued)

OTHER PUBLICATIONS

Ahmad, H., "Investigation of Electrical Properties of Field Grading Materials Based ZnO Microvaristors," A thesis submitted to Cardiff University in the candidature for the degree of Doctor of Philosophy, School of Engineering, Cardiff University, United Kingdom, Jan. 2017, 207 pages.

(Continued)

*Primary Examiner* — Arun Ramaswamy
(74) *Attorney, Agent, or Firm* — Withrow + Terranova, PLLC; Vincent K. Gustafson

(57) ABSTRACT

A capacitor header for coupling a voltage output from a capacitor, which allows the capacitor to store a large amount of charge and then discharge this as a high voltage, while reducing the risk of dielectric breakdown. The capacitor header includes a live output plate connected to a central live conductor of the capacitor and a ground output plate connected to a ground conductor of the capacitor. The capacitor header also includes first and second insulating members, which both have non-planar mating surfaces that interleave to form a non-linear path. An insulating seal is included between the non-planar mating surfaces. The capacitor header also includes two sets of insulating sheets. The sets of insulating sheets extend beyond an outer perimeter of the live output plate and the ground output plate.

20 Claims, 3 Drawing Sheets

(58) Field of Classification Search
USPC .................................. 361/279, 299.2, 301.1
See application file for complete search history.

(56) References Cited

U.S. PATENT DOCUMENTS

| | | | |
|---|---|---|---|
| 2003/0053284 A1 | 3/2003 | Stevenson et al. | |
| 2011/0317333 A1* | 12/2011 | Chun | H01G 4/232 |
| | | | 361/518 |
| 2015/0022991 A1* | 1/2015 | Stockman | H01G 4/224 |
| | | | 361/821 |

FOREIGN PATENT DOCUMENTS

| | | |
|---|---|---|
| CN | 205140752 U | 4/2016 |
| CN | 209087592 U | 7/2019 |
| GB | 2485032 A | 5/2012 |
| JP | 2008227265 A | 9/2008 |
| WO | 2015081487 A1 | 6/2015 |

OTHER PUBLICATIONS

Dupont Teijin Films, "Mylar® polyester film," Product Information, H-32192-1, Jun. 2003, 8 pages.
R.E. Beverly III & Associates, "Application Note 105: Transmission Lines—A Basic Primer on Strip Lines," Jan. 27, 2016, Retrieved from the Internet: <URL: http://www.reb3.com/pdf/AN105.pdf>, 44 pages.
Search Report under Section 17 for United Kingdom Patent Application No. GB2001050.0, mailed Mar. 19, 2020, 4 pages.
International Search Report and Written Opinion for International Patent Application No. PCT/GB2021/050143, mailed Apr. 14, 2021, 13 pages.
First Office Action for Chinese Patent Application No. 202180010694.5, mailed May 31, 2024, 9 pages.

* cited by examiner

CAPACITOR HEADER

This application is a 35 U.S.C. § 371 national phase filing of International Application No. PCT/GB2021/050143, filed on Jan. 22, 2021, and claims the benefit of United Kingdom Patent Application No. 2001050.0 filed on Jan. 24, 2020, wherein the entire contents of the foregoing applications are hereby incorporated by reference herein.

This invention relates to a capacitor header for coupling a voltage output from a capacitor which may be suitable for implementation in high voltage capacitors.

Capacitors may be charged and then discharged to provide a high voltage pulse, e.g. for delivering to a load. This may enable a higher voltage and current to be provided than is possible from a conventional high voltage supply, e.g. owing to the ability of capacitors to store a large amount of charge. However, storing a large amount of charge in a capacitor can present a number of challenges, particularly if it is also desired to discharge a high voltage pulse rapidly from the capacitor. This is because storing a large amount of charge requires all the components of a capacitor (e.g. including the capacitor header) to be well insulated from each other to avoid dielectric breakdown, while discharging a capacitor quickly requires a low inductance.

The inductance of a capacitor may be reduced by decreasing the geometric volume separating the conductive components of the capacitor, e.g. by decreasing the separation of the capacitor header output plates. However, a smaller separation between highly charged capacitor header output plates results in a high electric field gradient being formed between them across a reduced amount of dielectric material. If the electric field gradient exceeds the dielectric strength of the dielectric material between the capacitor header output plates, this can result in dielectric breakdown, e.g. in the form of surface tracking over the dielectric material and/or corona breakdown of the surrounding air. This may therefore degrade the ability of a capacitor to store charge for an extended period of time, e.g. while being charged to a high voltage.

The amount of dielectric material provided is therefore a trade-off between the ability of the capacitor to discharge rapidly and its ability to store charge, e.g. at a high voltage.

An aim of the present invention is to provide an improved capacitor header for coupling a voltage output from a capacitor.

When viewed from a first aspect, the present invention provides a capacitor header for coupling a voltage output from a capacitor, the capacitor header comprising:
- a live output plate for electrically connecting to a central live conductor of the capacitor;
- a ground output plate for electrically connecting to a ground conductor of the capacitor, the ground output plate comprising an aperture for allowing connection between the live output plate and the central live conductor;
- a first insulating member and a second insulating member each arranged at least partly within the aperture of the ground output plate, wherein each of the first insulating member and the second insulating member comprises an aperture for allowing connection between the live output plate and the central live conductor, wherein the each of the first insulating member and the second insulating member comprises a non-planar mating surface, and wherein the non-planar mating surfaces of the first insulating member and the second insulating member interleave each other to form a non-linear path between the ground output plate and the apertures in the first insulating member and the second insulating member;
- at least one insulating seal between the non-planar mating surfaces of the first insulating member and the second insulating member;
- a first set of one or more insulating sheets between the ground output plate and the second insulating member; and
- a second set of one or more insulating sheets between the live output plate and the second insulating member;
- wherein the first set of one or more insulating sheets and the second set of one or more insulating sheets extend beyond an outer perimeter of the live output plate and the ground output plate.

The present invention provides a capacitor header for a (e.g. high voltage) capacitor. The capacitor header is arranged for coupling a voltage output from the capacitor, e.g. to discharge the charge stored on the capacitor to a load. The capacitor header includes live and ground output plates that are arranged to be connected electrically to the live and ground conductors of a capacitor respectively. The capacitor header also includes first and second insulating members that are positioned at least partly within an aperture of the ground output plate. The aperture of the ground output plate, along with respective apertures in the first and second insulating members allows connection between the live output plate of the capacitor header and the live conductor of the capacitor.

The first and second insulating members each have a non-planar mating surface, with the mating surfaces interleaving each other (e.g. the non-planar mating surfaces face and engage with each other) to define a non-linear path across the mating surfaces between the ground output plate and the apertures of the first and second insulating members (i.e. the location where the connection between the live output plate and the live conductor of the capacitor is to be provided). An insulating seal is provided between the non-planar mating surfaces.

The capacitor header further includes first and second sets of insulation sheet(s). The sets of insulation sheet(s) extend beyond the live and ground output plates, and are positioned the ground output plate and the second insulating member, and between the live output plate and the second insulating member. Thus, the first and second sets of insulation sheet(s) are arranged between the live and ground output plates.

It will thus be appreciated that the combination of features of the capacitor header of the present invention help, at least in preferred embodiments, to allow a capacitor to be charged (e.g. relatively slowly) to a high voltage and then discharged relatively quickly. In particular, the non-linear path formed between the mating surfaces of the first and second insulating members helps to increase the path length between the ground output plate and the live output plate, without necessarily increasing the volume of the first and second insulating members. This helps to prevent dielectric breakdown (e.g. via surface tracking) and to reduce (e.g. minimise) the inductance of the capacitor header.

The seal between the first and second insulating members helps to provide a further barrier to surface tracking in the path between the first and second insulating members, and helps to expel any air (which in turn helps to prevent corona breakdown).

Finally, the transition towards the perimeter of the live and ground output plates to the first and second sets of insulation sheet(s) helps to reduce the distance between the live and ground output plates (thus reducing the inductance), while providing a relatively high dielectric strength barrier against dielectric breakdown. Since the sets of insulation sheet(s) extend beyond the outer perimeters of the live and ground output plates, this helps to increase the path between the outer perimeters of the live and ground output plates, helping to reduce the risk of surface tracking.

The capacitor header of the present invention may be used to couple the output voltage from any suitable and desired type of (e.g. high voltage) capacitor. In a preferred embodiment the capacitor comprises a metallised film, energy storage capacitor. Preferably the capacitor comprises a central live conductor (e.g. a "hot pin") and a ground conductor (e.g. in the form of an external capacitor housing or "ring") that form the terminals of the capacitor.

The ground output plate of the capacitor header may be electrically connected to the ground conductor of the capacitor in any suitable and desired way. In one embodiment the capacitor (header) comprises an annular conductive spacer between the ground output plate and the ground conductor. In one embodiment the capacitor (header) comprises a ground conductive capacitor ring between the ground output plate and the ground conductor. These connections help to convert from the, e.g. coaxial, geometry of the capacitor to the, e.g. planar, geometry of the output plates of the capacitor header. The annular conductive spacer helps to bridge the gap between the ground output plate and the ground conductive capacitor ring (e.g. owing to the thickness of the first and second insulating members), which thus helps to allow the ground and live output plates to be brought closer together.

Preferably the annular conductive spacer is between the ground output plate and the ground conductive capacitor ring. Preferably the ground conductive capacitor ring and/or the annular conductive spacer are arranged at the perimeter of the capacitor header.

Preferably the capacitor comprises a pair of capacitor plates, e.g. each connected to a respective terminal, and a (e.g. thin film) dielectric arranged therebetween. The capacitor header of the present invention is preferably arranged to be positioned at one end of the capacitor, e.g. at the ends of the ground and live conductors.

The invention extends to a capacitor per se and thus when viewed from a further aspect the invention provides a capacitor for storing electrical charge, wherein the capacitor comprises:

an outer ground conductor;
a central live conductor; and
a capacitor header for coupling a voltage output from the capacitor, wherein the capacitor header comprises:
a live output plate electrically connected to the central live conductor;
a ground output plate electrically connected to the ground conductor, the ground output plate comprising an aperture through which the central live conductor or a connector between the central live conductor and the live output plate extends;
a first insulating member and a second insulating member each arranged at least partly within the aperture of the ground output plate, wherein each of the first insulating member and the second insulating member comprises an aperture through which the central live conductor or a connector between the central live conductor and the live output plate extends, wherein the each of the first insulating member and the second insulating member comprises a non-planar mating surface, wherein the non-planar mating surfaces of the first insulating member and the second insulating member interleave each other to form a non-linear path between the ground output plate and the apertures in the first insulating member and the second insulating member;
at least one insulating seal between the non-planar mating surfaces of the first insulating member and the second insulating member;
a first set of one or more insulating sheets between the ground output plate and the second insulating member; and
a second set of one or more insulating sheets between the live output plate and the second insulating member;
wherein the first set of one or more insulating sheets and the second set of one or more insulating sheets extend beyond an outer perimeter of the live output plate and the ground output plate.

It will be appreciated that this aspect of the invention may (and preferably does) comprise one or more (e.g. all) of the preferred and optional features of the other aspects of the invention outlined herein.

The capacitor may be arranged to generate, and the capacitor header may be arranged to discharge, any suitable and desired voltage and/or current, e.g. to a load. Preferably the capacitor is arranged to generate, and the capacitor header is arranged to discharge, a voltage of at least 25 kV, e.g. at least 40 kV, e.g. approximately 50 kV. Preferably the capacitor header is arranged to discharge a (e.g. fault) current of at least 50 kA, e.g. at least 100 kA, e.g. at least 200 kA.

The capacitor may be used to discharge a voltage and current for any suitable and desired output, e.g. to a load. In one set of embodiments the capacitor is used (e.g. with other capacitors) to deliver a high voltage and current pulse to a load in a vacuum chamber, e.g. as part of a pulsed power system.

In one embodiment the capacitor header is (e.g. rotationally) symmetric, preferably about an axis through the (e.g. centre of the) aperture(s) of the first and/or second insulating members (and, e.g., the aperture of the ground output plate). Thus preferably the capacitor header (and, e.g., the capacitor) are (e.g. rotationally) symmetric about the central conductor of the capacitor. In a set of embodiments, one or more (e.g. all) of the components of the capacitor header are rotationally symmetric, preferably about an axis through the (e.g. centre of the) aperture(s) of the first and/or second insulating members (and, e.g., the aperture of the ground output plate). Thus preferably one or more (e.g. all) of the components of the capacitor header are coaxial with each other about the axis (of rotational symmetry) of the capacitor header.

Preferably one or more (e.g. all) of the components of the capacitor header are annular in a plane perpendicular to the axis (of rotational symmetry) of the capacitor header. This symmetry may extend to any (e.g. all) of the features of the capacitor header and/or the capacitor. Thus, for example, the (e.g. features of the) non-planar mating surfaces may be annular in a plane perpendicular to the axis (of rotational symmetry) of the capacitor header.

The live output plate may be connected to the central live conductor of the capacitor in any suitable and desired way. In one embodiment the capacitor header comprises a conductive connector electrically connected to the live output plate for electrically connecting to a central live conductor of the capacitor. Thus preferably the capacitor comprises a conductive connector electrically connected between the live output plate and the central live conductor of the capacitor. Preferably the conductive connector extends from the live output plate through the apertures of the ground output plate and of the first and second insulating members.

The components of the capacitor header may be retained together, e.g. in any suitable and desired way. In a set of embodiments, the capacitor header comprises a (e.g. conductive) fastener arranged to retain the components of the capacitor header together. Preferably the fastener extends between the live output plate and the first insulating member. Preferably the fastener extends through the central apertures of one or more (e.g. all) of the first and second insulating members, and the ground output plate, e.g. along the axis of symmetry of the capacitor header. Preferably the live output plate comprises a central aperture (e.g. aligned, e.g. coaxial, with the central apertures of the first and second insulating members) through which the fastener extends.

In one embodiment the fastener is conductive. Thus preferably the fastener comprises the conductive connector for electrically connecting the live output plate to a central live conductor of the capacitor (or, e.g., vice versa: the conductive connector comprises the fastener).

Preferably the fastener is arranged to clamp the components of the capacitor header together. Thus preferably the fastener is arranged to clamp the other components (inter alia, one or more (e.g. all) of the second insulating member, the at least one insulating seal and the ground output plate) of the capacitor header between the live output plate and the first insulating member. This helps to compress the components of the capacitor header together, which helps to expel air between the components. In turn, this helps to reduce the risk of electrical breakdown, e.g. owing to corona breakdown of air between or surrounding the output plates. It also helps to retain the components of the capacitor header together when the capacitor is discharged through the capacitor header, as this may generate large forces on the components of the capacitor header.

The fastener may be provided in any suitable and desired way. In one embodiment the fastener comprises a (e.g. conductive) retaining bolt. Preferably the head of the retaining bolt is arranged to engage with the live output plate. Preferably the fastener comprises a (e.g. conductive) nut, e.g. a collar, that receives and connects to the retaining bolt. Preferably the nut is arranged to engage with the first insulating member. Thus preferably the (e.g. head and nut of the) bolt is arranged to clamp the other components (e.g. one or more (e.g. all) of the second insulating member, the at least one insulating seal and the ground output plate) of the capacitor header between the live output plate and the first insulating member.

The fastener may be arranged to clamp the components of the capacitor header together with any suitable and desired force (or torque). In one embodiment the fastener is arranged to clamp the components of the capacitor header together with a torque of at least 50 Nm. When the fastener comprises a nut and a bolt, preferably the nut and bolt are arranged to be fastened together with a torque of at least 50 Nm. This helps to expel the air from between the components of the capacitor header, helping to reduce the risk of electrical breakdown, and helps to retain the components of the capacitor header together when the capacitor is discharged.

When the fastener comprises the conductive connector for electrically connecting to the live conductor of the capacitor, preferably the (e.g. nut of the) capacitor is arranged to electrically connect to the live conductor of the capacitor.

The conductive connector and the fastener may be formed from any suitable and desired (e.g. conductive) materials. In one embodiment the conductive connector and/or the fastener are formed from metal, e.g. stainless steel.

In one set of embodiments the live output plate and/or the ground output plate are substantially planar. Thus preferably the live output plate and/or the ground output plate has a thickness (e.g. in a direction parallel to the axis of the capacitor header) that is (e.g. significantly) less than a width (e.g. in a radial direction perpendicular to the axis of the capacitor header) of the live output plate and/or the ground output plate. Preferably the live output plate and the ground output plate have approximately the same outer dimension (e.g. in a radial direction perpendicular to the axis of the capacitor header), e.g. approximately the same outer perimeter. Thus preferably an outer diameter (or dimension, and, e.g., perimeter) of the live output plate is approximately equal to an outer diameter (or dimension, and, e.g., perimeter) of the ground output plate. Preferably the outer perimeters of the live and ground output plates are substantially aligned.

In the embodiments in which the live output plate comprises an aperture, preferably the aperture of the ground output plate is (e.g. significantly) larger than the aperture of the live output plate. For example, the aperture of the live output plate may be sized to accommodate the fastener or connector, while the aperture of the ground output plate may be sized to accommodate (e.g. at least part of) the first and second insulating members. Preferably an inner dimension (e.g. diameter) (e.g. in a radial direction perpendicular to the axis of the capacitor header) of the live output plate is (e.g. significantly) less than an inner dimension (e.g. diameter) of the ground output plate. It will be seen that the inner dimension of the live and ground output plates corresponds to the outer dimension (e.g. diameter) of the respective apertures.

In one embodiment the ground output plate has a substantially constant thickness (e.g. from its inner dimension to its outer dimension (perimeter)). In one embodiment the live output plate comprises an outer portion (e.g. radially towards the perimeter of the live output plate) having a greater thickness than an inner portion. Thus preferably the (e.g. inner portion of the) live output plate comprises a recess for accommodating the second insulating member and, e.g., the second set of insulating sheet(s). This helps to decrease the separation between the live and ground output plates at the outer portion of the live output plate where, e.g., they are separated by (e.g. only) the first and second sets of insulating sheets, thus helping to reduce (e.g. minimise) the inductance.

Preferably the outer portion of the live output plate (i.e. the portion having the greater thickness) has an inner dimension (e.g. diameter) that is greater than the inner dimension of the ground output plate, in other words the outer dimension of the inner portion of the live output plate is greater than the outer dimension of the aperture in the ground output plate. Thus, as will be discussed below, preferably the second insulating member has an outer dimension (e.g. diameter) that is greater than the inner dimension (e.g. diameter) of the ground output plate, e.g. such that the second insulating member and the ground output plate overlap (e.g. in the radial direction), e.g. separated by the first set of insulating sheet(s).

The live and ground output plates may be formed from any suitable and desired (e.g. conductive) material. In one embodiment the live output plate and/or the ground output plate are formed from metal, e.g. aluminium.

The first and second insulating members are each at least partly within the aperture of the ground output plate, e.g. at least partly within the inner dimension of the ground output plate. In one embodiment the first insulating member is wholly within the aperture of the ground output plate. Thus preferably an outer dimension (e.g. diameter) of the first insulating member is less than or equal to the inner dimension (e.g. diameter) of the ground output plate (e.g. in a direction perpendicular to the axis of the capacitor header).

In one embodiment the second insulating member is partly within the aperture of the ground output plate. Thus preferably an outer dimension (e.g. diameter) of the second insulating member is greater than or equal to the inner dimension (e.g. diameter) of the ground output plate (e.g. in a direction perpendicular to the axis of the capacitor header), while an inner dimension (e.g. diameter) of the second insulating member is less than or equal to the inner dimension (e.g. diameter) of the ground output plate (e.g. in a direction perpendicular to the axis of the capacitor header). In this embodiment the second insulating member overlaps (e.g. radially) with the ground output plate. Thus preferably the outer portion of the second insulating member is sandwiched between the ground and live output plates, with a set of first or second insulating sheet(s) between the second insulating member and the respective output plate.

The apertures of the first and second insulating members may be any suitable and desired size, e.g. relative to each other and/or to the aperture of the live output plate (when provided). In a preferred embodiment the aperture of the first insulating member is larger than the aperture of the second insulting member. Preferably the apertures of the first and/or second insulating members are (e.g. each) larger than the aperture of the live output plate (when provided). Thus preferably the inner dimension (e.g. diameter) of the first insulating member is less than or equal to the inner dimension (e.g. diameter) of the second insulating member (e.g. in a direction perpendicular to the axis of the capacitor header). Preferably the inner dimension (e.g. diameter) of the first and/or second insulating member is less than or equal to the inner dimension (e.g. diameter) of the live output plate (e.g. in a direction perpendicular to the axis of the capacitor header).

The first and second insulating members may be arranged in any suitable and desired way such that their non-planar mating surfaces interleave with each other. Preferably the second insulating member is closer (e.g. in an axial direction) to the live output plate than the first insulating member. Preferably the second insulating member is sandwiched between the live output plate and the first insulating member.

Preferably the first insulating member is closer (e.g. in an axial direction) to the main body of the capacitor than the second insulating member. Preferably the first insulating member is adjacent to (e.g. in contact with) the main body of the capacitor.

Preferably the first and/or second insulating members (e.g. each) have a thickness (e.g. in a direction parallel to the axis of the capacitor header) that is less than a width (e.g. in a radial direction perpendicular to the axis of the capacitor header) of the first and/or second insulating members (e.g. respectively). Providing relatively flat first and/or second insulating members helps to reduce the (e.g. axial) thickness of the capacitor header, e.g. between the ground and live output plates, thus helping to reduce the inductance.

It will be appreciated that because the non-planar mating surfaces are two dimensional, preferably the non-linear path between the ground output plate and the apertures in the first insulating member and the second insulating member is a non-planar area. Preferably the first and second insulating members engage with (e.g. contact) each other at the non-linear path formed by their respective non-planar mating surfaces, e.g. except where the insulating seal is provided between the non-planar mating surfaces. Thus preferably the non-planar mating surface of the first insulating member is complementary to the non-planar mating surface of the second insulating member.

It will be appreciated that the non-linear path between the ground output plate and the apertures in the first insulating member and the second insulating member generally forms the path of least resistance between the live and ground output plates, along which surface tracking is likely to occur. Thus, by making the path non-linear to increase its length and providing barriers (in the form of seal(s) along the path), this helps to reduce the risk of surface tracking occurring.

The non-planar mating surfaces may have any suitable and desired shape for forming the non-linear path. In a set of embodiments the non-planar mating surfaces (e.g. each) comprise one or more (e.g. complementary) interleaving projections and recesses, e.g. having a (e.g. rectangular) stepped cross section (e.g. in a plane parallel to the axis of the capacitor header). Preferably the interleaving projection(s) and recess(es) extend over the non-planar mating surfaces, e.g. as interleaving walls and channels. Preferably the interleaving projection(s) and recess(es) extend substantially perpendicularly to the path between the ground output plate and the apertures in the first and second insulating members.

When the capacitor header (and, e.g., the first and second insulating members) is rotationally symmetric, preferably the non-planar mating surfaces comprise one or more azimuthally extended (e.g. cylindrical) interleaving walls and channels (e.g. (each) having a (e.g. rectangular) stepped cross section). Preferably the one or more azimuthally extended interleaving walls and channels are coaxial with the axis of the capacitor header.

Thus, in a preferred set of embodiments the non-planar mating surface of the first insulating member comprises one or more projecting walls and recessed channels, e.g. which are azimuthally extended. Preferably the one or more projecting walls and recessed channels (e.g. each) comprise a (e.g. rectangular) stepped cross section. It will be appreciated that a rectangular (e.g. square) stepped cross section in the non-planar mating surfaces helps to provide a castellated geometry that helps to increase the non-linear path between the ground plate and the apertures in the first and second insulating members, and thus helps to reduce the risk of surface tracking.

Preferably the non-planar mating surface of the second insulating member comprises one or more projecting walls and recessed channels, e.g. which are azimuthally extended. Preferably the one or more projecting walls and recessed channels (e.g. each) comprise a (e.g. rectangular) stepped cross section. Preferably the one or more projecting walls of the first insulating member project into the one or more recessed channels of the second insulating member. Preferably the one or more projecting walls of the second insulating member project into the one or more recessed channels of the first insulating member.

Preferably the first and second insulating members (e.g. each) comprise a plurality of projecting walls and recessed channels. When a plurality of projecting walls are provided, preferably one or more of the recessed channels are defined between an adjacent pair of projecting walls. In a preferred embodiment the first insulating member comprises three projecting walls and two recessed channels (e.g. between the projecting walls), and the second insulating member comprises two projecting walls and three recessed channels (e.g. between and either side of the projecting walls).

The walls may project (and thus the channels may be recessed) any suitable and desired distance. In a set of embodiments the projecting wall(s) have a height (and thus the recessed channel(s) have a depth) of at least 0.5 cm, e.g. approximately 1 cm. This helps to provide a suitable balance between the number of the interleaving projecting walls and recessed channels, the thickness of the first and second insulating members and the strength of the first and second insulating members. It will be appreciated that finding this balance helps to increase the non-linear path length between the ground output plate and the apertures in the first and second insulating members (to reduce the risk of surface tracking), reduce the inductance of the capacitor header and maintain a suitable strength for the capacitor header for the stresses it may experience during discharge of the capacitor. Preferably the height of a (e.g. each) projecting wall is substantially equal to the depth of a corresponding recessed channel (e.g. less the thickness of the insulating seal therebetween).

The first and second insulating members may be formed from any suitable and desired dielectric material. In a set of embodiments the first and/or second insulating member is formed from plastic, e.g. a thermoplastic. Preferably the first and/or second insulating member is formed from polyoxymethylene (also known as acetal). Acetal has a relatively high stiffness, and dielectric strength, and a good dimensional stability. This helps to provide good insulation and structural integrity in the capacitor header, particularly when a high energy voltage pulse is discharged from the capacitor.

The at least one insulating seal may be provided in any suitable and desired way between the non-planar mating surfaces of the first and second insulating members, e.g. depending on the geometry of the non-planar mating surfaces. The at least one insulating seal may extend over the whole area between the non-planar mating surfaces between the first and second insulating members. However, preferably the at least one insulating seal extends over a portion (i.e. that is less than the whole area) of the area between the non-planar mating surfaces. Preferably other surface areas between the non-planar mating surfaces of the first and second insulating members do not contact each other directly, because otherwise this may compromise the compression of the seals.

In a set of embodiments, the at least one insulating seal is positioned between the interleaving projection(s) and recess(es) (e.g. interleaving wall(s) and channel(s)) of the non-planar mating surfaces. In a particularly preferred embodiment the at least one insulating seal is positioned in the channel(s) (e.g. of the second insulating member), e.g. such that it seals between the base of the channel (e.g. of the second insulating member) and the top of the wall (e.g. of the first insulating member). Thus when the non-planar mating surfaces comprise a plurality of interleaving projections and recesses (e.g. interleaving walls and channels), preferably the capacitor header comprises a plurality of insulating seals between the non-planar mating surfaces. Preferably the at least one insulating seal has a width that is substantially equal to the width of the interleaving projection(s) and recess(es).

Preferably the at least one insulating seal comprises at least one annular insulating seal, e.g. when the capacitor header is rotationally symmetric. Thus when the capacitor header comprises a plurality of insulating seals, preferably the plurality of insulating seals comprise a plurality of concentric (e.g. annular) insulating seals, e.g. coaxial with the axis of the capacitor header.

In a set of embodiments, when the capacitor header comprises a plurality of insulating seals, the insulating seal(s) closer to the ground output plate (e.g. closer to the edge of the capacitor header) have a thickness (e.g. in a direction parallel to the axis of the capacitor header) that is greater than a thickness of the insulating seal(s) closer to the apertures of the first and second insulating members (e.g. closer to the centre of the capacitor header). These different thicknesses of the seals helps to obtain a uniform seal between the non-planar mating surfaces, e.g. owing to the components of the capacitor header being retained (e.g. clamped) together through the apertures of the first and second insulating members (e.g. at the centre of the capacitor header).

In a set of embodiments, the capacitor header comprises an additional insulating seal between the second insulating member and the live output plate. The additional insulating seal helps to further expel air between the components of the capacitor header, thus further reducing the risk of electrical breakdown. Preferably the additional insulating seal comprises an annular seal, e.g. having a central aperture, e.g. coaxial with the axis of the capacitor header.

In a set of embodiments (e.g. an inner portion (e.g. radially towards the inner dimension)) of the second insulating member comprises a recess for accommodating the additional insulating seal. The recess both helps to locate the additional insulating seal and to reduce the combined thickness of the second insulating member and the additional insulating seal.

The at least one insulating seal (and, e.g., the additional seal) may be formed from any suitable and desired dielectric material. Preferably the at least one insulating seal (and, e.g., the additional seal) comprises a compressible material. This helps to fill the gap between the non-planar mating surfaces, thus helping to expel air, which helps to reduce the risk of electrical (corona) breakdown.

In a set of embodiments the at least one insulating seal (and/or, e.g., the additional seal) comprises silicone. Silicone is compressible and is resistant to breaking under compression, such that it retains its structural integrity when compressed under the force that may be required to hold the components of the capacitor header together, e.g. when the capacitor is discharged.

In a set of embodiments, the at least one insulating seal (and/or, e.g., the additional seal) comprises a doping agent, e.g. zinc oxide. The addition of a doping agent (e.g. zinc oxide) to the at least one insulating seal helps to reduce any enhancement of the localised electric field between the ground and live output plates, therefore reducing the likelihood of corona breakdown of any remaining surrounding air and reducing the risk of surface tracking which can lead to electrical breakdown. Preferably the doping level of the doping agent is 50/50 by weight in the at least one insulating seal.

The first and second sets of one or more insulating sheets may be provided in any suitable and desired way between the ground and live output plates, and the second insulating member. In one set of embodiments the first and/or second set of one or more insulating sheets (e.g. each) comprises an (e.g. central) aperture, e.g. coaxial with the axis of the capacitor header.

The first set of one or more insulating sheets may overlap with the ground output plate and with the second insulating member by any suitable and desired amount such that it is provided between the ground output plate and the second insulating member. In a set of embodiments the first set of one or more insulating sheets extends between (e.g. a projection of) the first insulating member and (e.g. a recess of) the second insulating member. Preferably an insulating seal is positioned between the first set of one or more insulating sheets and the (e.g. projection of) the first insulating member. Thus in a set of embodiments an inner dimension (e.g. diameter) (e.g. in a direction perpendicular to the axis of the capacitor header) of the first set of one or more insulating sheets is less than an inner dimension (e.g. diameter) of the ground output plate and/or less than an outer dimension (e.g. diameter) of the first insulating member. Thus preferably the first set of one or more insulating sheets extends across the whole of the ground output plate.

The second set of one or more insulating sheets may overlap with the live output plate and with the second insulating member by any suitable and desired amount such that it is provided between the live output plate and the second insulating member. In a set of embodiments an inner dimension (e.g. diameter) (e.g. in a direction perpendicular to the axis of the capacitor header) of the second set of one or more insulating sheets is approximately equal to an inner dimension (e.g. diameter) of the second insulating member and/or less than an inner dimension (e.g. diameter) of the ground output plate. Thus preferably the second set of one or more insulating sheets extends across the whole of the second insulating member and/or substantially the whole of the live output plate.

When the capacitor header comprises an additional insulating seal between the second insulating member and the live output plate, preferably the additional insulating seal is positioned between the second insulating member and the second set of insulating sheet(s). Thus preferably the second set of insulating sheet(s) is positioned between the additional insulating seal and the live output plate. Preferably the second set of insulating sheet(s) extends across the whole of the recess in the second insulating member in which the additional insulating seal is located.

When the second insulating member has an outer dimension that is less than (e.g. radially inward of) the outer perimeter of the live and ground output plates, preferably (e.g. only) the first and second sets of insulating sheet(s) extend between the (e.g. outer portions of) the live and ground output plates. This helps to allow the live and ground output plates to be positioned close to each other, helping to reduce the inductance of the capacitor header.

The first and second set of insulating sheet(s) may extend by any suitable and desired distance beyond the perimeter of the ground and live output plates. In one set of embodiments the first and second set of insulating sheet(s) extend beyond the perimeter of the ground and live output plates by greater than 10 cm, e.g. greater than 20 cm, e.g. approximately 30 cm. This helps to increase the path length around the sheets between the live and ground output plates, to reduce the risk of surface tracking between the live and ground output plates. While an inner portion of the first and/or second sets of insulating sheet(s) may extend linearly in a direction perpendicular to the axis of the capacitor header, e.g. parallel to the (e.g. substantially planar) live and ground output plates, preferably an outer portion of the first and/or second sets of insulating sheet(s) are curved (e.g. in a direction away from the plane of the inner portion of the first and/or second sets of insulating sheet(s)). This helps to further increase and disrupt the path between the live and ground output plates, to reduce the risk of surface tracking between the live and ground output plates.

The first and second sets of insulating sheet(s) may each comprise only a single insulating sheet. However, in a set of embodiments, the first and/or second sets of insulating sheets (e.g. each) comprises a plurality of insulating sheets. The plurality of insulation sheets in (e.g. each) of the first and/or second sets of insulation sheets preferably comprises at least ten insulation sheets, e.g. at least ten insulation sheets, e.g. at least fifteen insulation sheets, e.g. approximately twenty insulation sheets. Providing multiple sheets in each set of insulation sheets helps to increase the amount of insulation, which helps to reduce the risk of electrical punch-through between the live and ground output plates.

The first and second sets of insulating sheet(s) may have any suitable and desired geometry. Preferably (e.g. each of) the one or more insulating sheets in the first and second sets of insulating sheet(s) have a thickness (e.g. in a direction parallel to the axis of the capacitor header) less than 200 microns, e.g. less than 100 microns, e.g. approximately 75 microns. The thickness of the sheet(s) may be chosen to provide a balance between thin sheets that are more easily damaged and the insulating ability of multiple thin sheets. The Applicant has appreciated that a larger number of thinner insulation sheets helps to offer greater protection against electrical breakdown, while having little effect on the separation of the live and ground output plates.

The first and second sets of insulating sheet(s) may be made from any suitable and desired (dielectric) material, e.g. a thin film. In a preferred embodiment the first and second sets of insulating sheet(s) are made from a polyester, e.g. biaxially-oriented polyethylene terephthalate (boPET) such as Mylar®. Such a stretched thin film has a relatively high dielectric strength (thus providing a greater resistance to dielectric breakdown when subject to a high electric field) and is relatively durable and pliable (making it suitable for being manipulated when assembling the capacitor header).

It will be seen from the above that the different components of the capacitor and the capacitor header may be arranged in different ways in different embodiments. However, in a particularly preferred embodiment the components of the capacitor are arranged in the following order (e.g. in the axial direction): the live output plate, the second set of insulating sheet(s), the additional insulating seal (when provided), the second insulating member, the first set of insulating sheet(s), the ground output plate. Also following the first set of insulating sheet(s) (e.g. in the axial direction) are the at least one insulating seal and the first insulating member.

Thus, in one set of embodiments the (e.g. first and) second insulating member(s) and/or the first and second sets of insulating sheet(s) are arranged to separate the ground output plate and the live output plate.

A preferred embodiment of the invention will now be described, by way of example only, with reference to the accompanying drawings in which.

An embodiment of a capacitor header in accordance with the present invention will now be described. The capacitor header helps to enable a high voltage pulse to be discharged rapidly from a capacitor.

Figure 1:
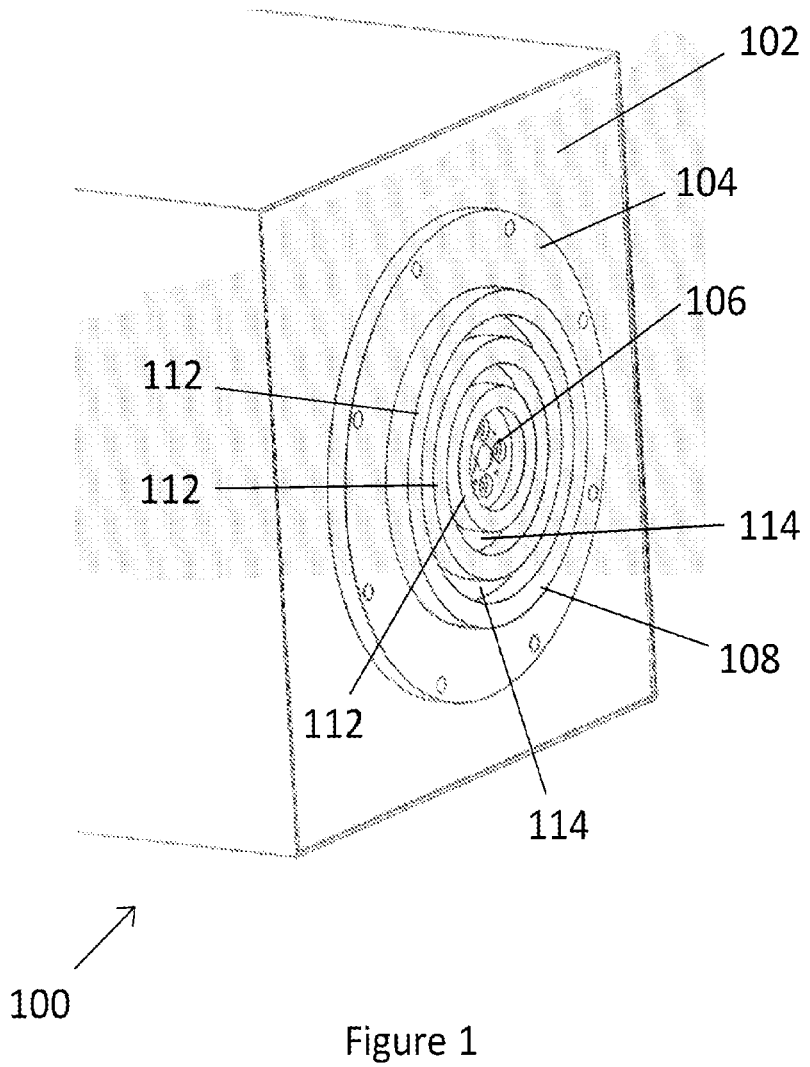
FIG. 1 shows the outer components of an exemplary capacitor as well as some components of a capacitor header according to an embodiment of the present invention.

FIG. 1 shows the outer components of an exemplary capacitor 100, for use with a capacitor header, as well as components of a capacitor header in accordance with an embodiment of the present invention. The capacitor 100 may be charged to generate a large potential difference between the two capacitor plates. The capacitor 100 comprises a metal outer casing 102 connected to an earth. The outer casing 102 is conductively connected to a conductive metal ground ring 104 that is integral to the outer casing 102 of the capacitor 100. The ground ring 104 is conductively connected to an internal ground conductor (not shown) of the capacitor 100.

Figure 2:
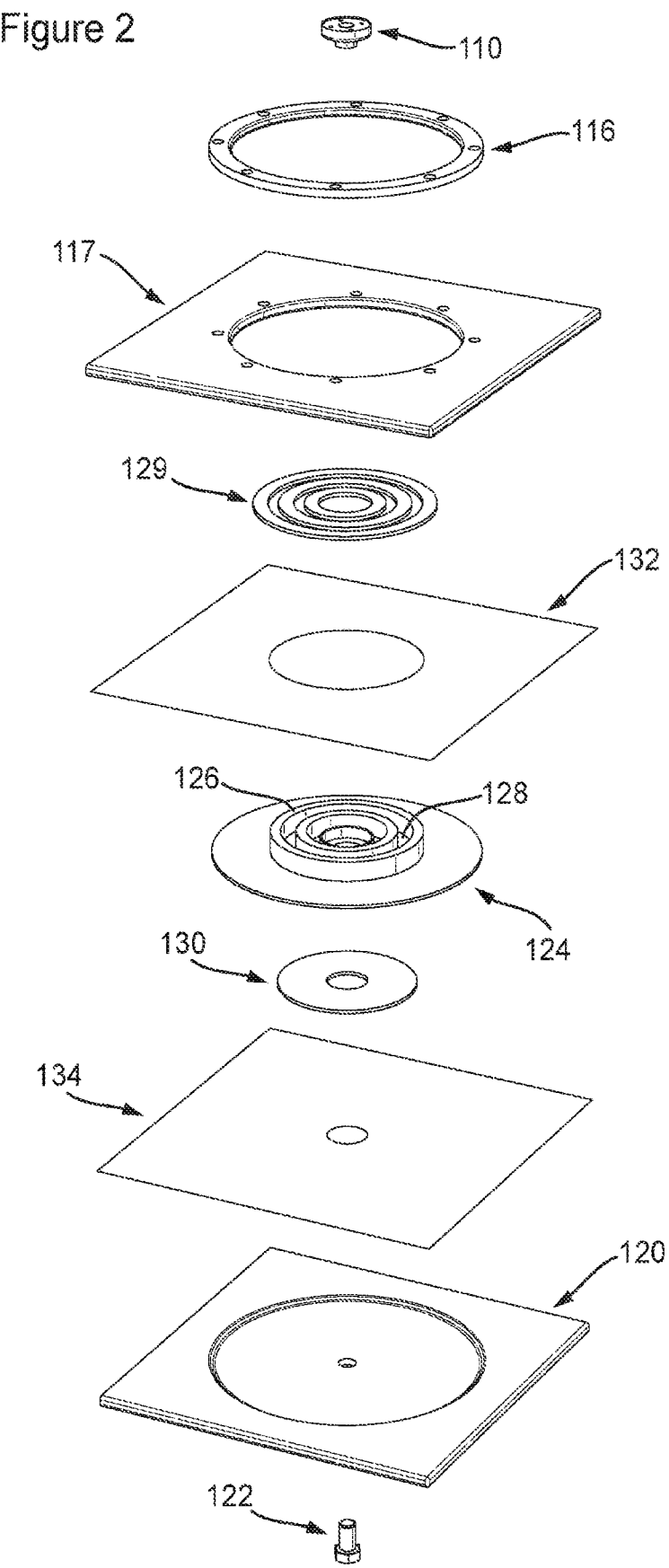
FIG. 2 shows an exploded view of a capacitor header according to an embodiment of the present invention for use with the capacitor shown in FIG. 1.
Figure 3:
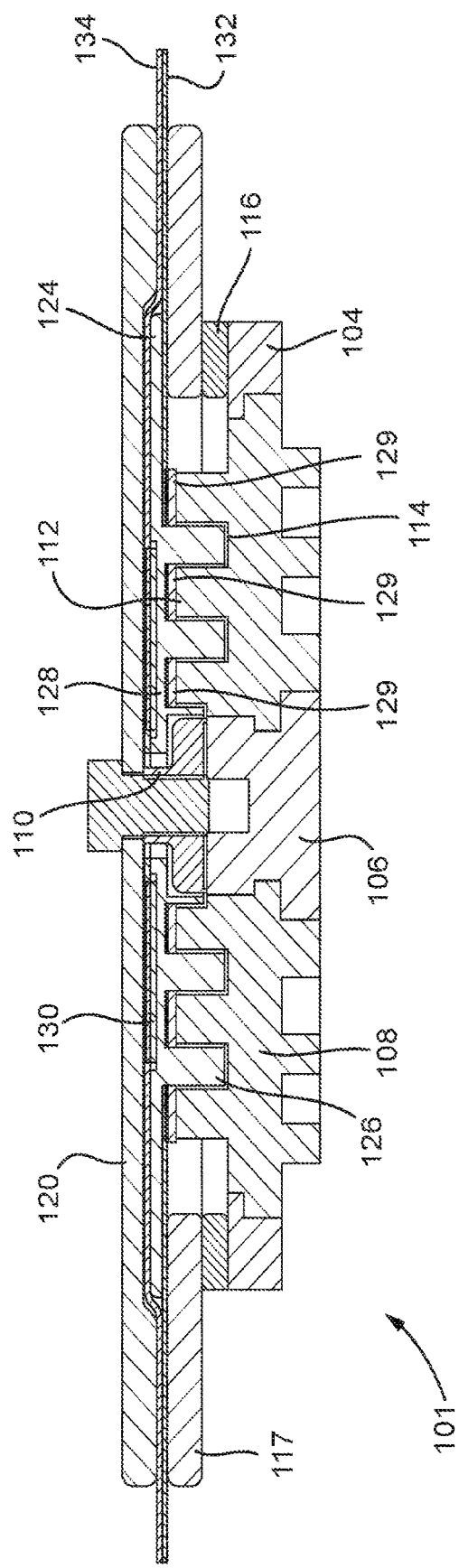
FIG. 3 shows a cross-sectional view of the capacitor header shown in FIGS. 1 and 2.

The capacitor 100 also comprises a metal central live conductor 106 (that has formed therein a threaded central aperture for receiving a bolt) for connecting to a live output plate of the capacitor header (as will be shown in FIGS. 2 and 3). FIG. 1 also shows a first insulating member 108 (of a capacitor header in accordance with an embodiment of the present invention) located within an aperture defined by the annular ground ring 104. The first insulating member 108 is also annular and is arranged coaxially with the ground ring 104 and the central live conductor 106 of the capacitor 100.

The first insulating member 108 comprises a central aperture in which the central live conductor 106 is located. As will be shown in FIGS. 2 and 3, the central live conductor 106 is arranged to be connected to the live output plate of the capacitor header. The first insulating member 108 also comprises three concentric projecting walls 112 and two recessed channels 114 defined between the projecting walls 112. The projecting walls 112 and recessed channels 114 have a square stepped cross section in the radial direction.

In order to discharge a voltage and current from the capacitor, for delivering to a load, the capacitor 100 shown in FIG. 1 comprises a capacitor header for coupling the output voltage from the capacitor.

FIG. 2 shows an exploded view of a capacitor header according to an embodiment of the present invention for use with the capacitor 100 shown in FIG. 1. FIG. 3 shows a cross-sectional view of the capacitor header 101 shown in FIG. 2 (and some of the parts thereof in FIG. 1). A number of the components of the capacitor header 101 are shown with the capacitor 100 in FIG. 1.

The capacitor header 101 includes a ground output plate 117, which is conductively connected to the ground conductor of the capacitor 100 via a metal annular spacer ring 116 and the ground ring 104 of the outer casing 102 of the capacitor 100. The spacer ring 116 and the ground ring 104 each have an inner diameter that is the same as the inner diameter of the ground output plate 117 but each have a smaller outer diameter than the ground output plate 117. For the purposes of simplicity, the ground ring 104 and the first insulating member 108 are not shown in FIG. 2.

The capacitor header 101 also includes a metal live output plate 120, which is conductively connected to the live conductor 106 of the capacitor via a conductive metal collar 110 and a conductive metal retaining bolt 122 that passes through a central aperture in the live output plate 120 and screws into the conductive collar 110 and the live conductor 106. The ground and live output plates 117, 120 thus form a pair of transmission lines for discharging the capacitor 100.

As can be seen from FIG. 3, the live conductor 106 engages with the underside of the first insulating member 108 (which thus forms part of the capacitor header 101) to clamp the components of the capacitor header 101 together between the live output plate 120 and the first insulating member 108. The conductive collar 110 sits between the live conductor 106 and the live output plate 120, and thus conductively connects the central live conductor 106 of the capacitor 100 to the live output plate 120 via the conductive retaining bolt 122.

A step on the outer diameter of the first insulating member 108 engages with a step on the inner diameter of the ground ring 104. The three concentric projecting walls 112 and two recessed channels 114 of the first insulating member 108 interleave with an annular second insulating member 124 of the capacitor header 101. The second insulating member 124 has a central aperture, as well as two concentric projecting walls 126 and three recessed channels 128 that are complementary to (i.e. have the same shape and dimensions as) the three concentric projecting walls 112 and two recessed channels 114 of the first insulating member 108 such that they define a castellated path between them.

The second insulating member 124 has an outer portion that extends between the live output plate 120 and the ground output plate 117. The live output plate 120 has a recess in its face that is adjacent the second insulating member 124 to accommodate the second insulating member 124. An outer edge portion of the live output plate 120 then steps back towards the ground output plate 117.

The first insulating member 108 and the second insulating member 124 are each formed from polyoxymethylene (acetal).

Three concentric annular sealing rings 129, made from silicone doped with zinc oxide, are located in the three recessed channels 128 of the second insulating member 124. Each sealing ring 129 has a greater thickness than the sealing ring 129 radially inside it, in order to account for the clamping of the capacitor header 101 at the centre by the retaining bolt 122. The sealing rings 129 are therefore compressed between the three recessed channels 128 of the second insulating member 124 and the respective three concentric projecting walls 112 of the first insulating member 108. A further annular seal 130 is located in a recess in the other side of the second insulating member 124.

The capacitor header 101 also includes first and second sets of insulating sheets 132, 134. The first and second sets of insulating sheets 132, 134 each have twenty sheets formed from boPET, e.g. Mylar®, with each sheet having a thickness of 75 microns. Although not shown, the first and second sets of insulating sheets 132, 134 extend further outwards from the capacitor header 101 and each set is bent away from the plane in which they are shown in FIG. 3.

The first set of insulating sheets 132 extends between the live and ground output plates 120, 117, between the ground output plate 117 and the second insulating member 124, and between the outer sealing ring 129 and the recessed channel 128 of the second insulating member 124. Thus the inner diameter of the first set of insulating sheets 132 coincides with the outer diameter of the outermost of the two projecting walls 126 of the second insulating member 124.

The second set of insulating sheets 134 extends between the live and ground output plates 120, 117, and between the live output plate 120 and the second insulating member 124. The inner diameter of the second set of insulating sheets 134 coincides with the inner diameter of the second insulating member 124. The second set of insulating sheets 134 thus extends across the further annular seal 130, between the annular seal 130 and the live output plate 120.

Operation of the capacitor header 101 will now be described with reference to FIGS. 1 to 3.

In operation, the capacitor 100 and the capacitor header 101 are assembled as shown in FIGS. 1 and 3. The components of the capacitor header 101 are clamped together between the retaining bolt 122 and the live conductor 106. This acts both to retain the components of the capacitor header 101 together and to conductively connect the live output plate 120 of the capacitor header 101 with the central live conductor 106 of the capacitor 100. The force exerted by the retaining bolt 122 acts to compress the three concentric annular sealing rings 129 between the three recessed channels 128 of the second insulating member 124 and the respective three concentric projecting walls 112 of the first insulating member 108. The further annular seal 130 is also compressed between the second insulating member 124 and the second set of insulating sheets 134.

To generate a high voltage and current output pulse from the capacitor 100, the internal capacitor plates (connected to the central live conductor 106 and the ground conductor of the capacitor 100 respectively) are charged over a period of time to a high potential difference. Owing to the conductive connections to the ground and live output plates 117, 120, a large potential difference is formed between the ground and live output plates 117, 120. However, the insulating components of the capacitor header 101 prevent dielectric breakdown, e.g. via surface tracking or corona discharge. This allows the potential difference to be held for a relatively long period of time while the capacitor is being charged.

It will be seen that there are two main paths between the ground and live output plates 117, 120 over which electrical breakdown may occur. The first is around the edges of the first and second sets of insulating sheets 132, 134. However, the first and second sets of insulating sheets 132, 134 extend significantly beyond the outer diameter of the ground and live output plates 117, 120, and they are also bent away from the plane shown in FIG. 3. This has the effect of increasing the path length between the ground and live output plates 117, 120 around the first and second sets of insulating sheets 132, 134, which helps to reduce the risk of surface tracking along this path. Furthermore, the first and second sets of insulating sheets 132, 134 (comprising forty sheets of Mylar) between the ground and live output plates 117, 120 reduce the risk of electrical punch-through and thus direct dielectric breakdown of the first and second sets of insulating sheets 132, 134.

A second path between the ground and live output plates 117, 120 exists from the ground output plate 117 along the path between the first and second insulating members 108, 124. However, a number of features make it difficult for surface tracking and corona breakdown to occur along this path. First, the interleaving concentric projecting walls 112, 126 and recessed channels 114, 128 of the first and second insulating members 108, 124 create a highly tortuous castellated path between the ground and live output plates 117, 120, thus helping to reduce the risk of surface tracking along this path. Second, the compression of the annular sealing rings 129 and the further annular seal 130 helps to expel air from the capacitor header 101, in particular from the path between the ground and live output plates 117, 120. This helps to reduce the risk of corona breakdown. The presence of the annular sealing rings 129, the further annular seal 130 and the addition of a doping agent (e.g. zinc oxide) to the material of the seals 129, 130 also helps to provide a barrier to surface tracking.

It will also be seen that the geometric arrangement of the first and second insulating members 108, 124 and the first and second sets of insulating sheets 132, 134, while providing relatively long path lengths between the ground and live output plates 117, 120, allows the ground and live output plates 117, 120 to be brought close together in the capacitor header 101. This helps to reduce the inductance of the capacitor header, such that the capacitor may be discharged relatively quickly.

It will thus be seen from the above that in at least preferred embodiments the capacitor and capacitor header of the present invention allow the capacitor to store a large amount of charge and then discharge this as a high voltage and current pulse rapidly from the capacitor, while reducing the risk of dielectric breakdown.

The invention claimed is:

1. A capacitor header for coupling a voltage output from a capacitor, the capacitor header comprising:
a live output plate for electrically connecting to a central live conductor of the capacitor;
a ground output plate for electrically connecting to a ground conductor of the capacitor, the ground output plate comprising an aperture for allowing connection between the live output plate and the central live conductor;
a first insulating member and a second insulating member each arranged at least partly within the aperture of the ground output plate, wherein each of the first insulating member and the second insulating member comprises an aperture for allowing connection between the live output plate and the central live conductor, wherein the each of the first insulating member and the second insulating member comprises a non-planar mating surface, and wherein the non-planar mating surfaces of the first insulating member and the second insulating member interleave each other to form a non-linear path between the ground output plate and the apertures in the first insulating member and the second insulating member;
at least one insulating seal between the non-planar mating surfaces of the first insulating member and the second insulating member;
a first set of one or more insulating sheets between the ground output plate and the second insulating member; and
a second set of one or more insulating sheets between the live output plate and the second insulating member;
wherein the first set of one or more insulating sheets and the second set of one or more insulating sheets extend beyond an outer perimeter of the live output plate and the ground output plate.

2. The capacitor header as claimed in claim 1, wherein the capacitor header is rotationally symmetric about an axis through the apertures of the first and second insulating members.

3. The capacitor header as claimed in claim 1, wherein the capacitor header comprises a conductive connector electrically connected to the live output plate for electrically connecting to a central live conductor of the capacitor.

4. The capacitor header as claimed in claim 1, wherein the capacitor header comprises a fastener that extends between the live output plate and the first insulating member to retain the components of the capacitor header together.

5. The capacitor header as claimed in claim 1, wherein the live output plate comprises a central aperture, wherein an outer dimension of the aperture of the ground output plate is greater than an outer dimension of the aperture of the live output plate.

6. The capacitor header as claimed in claim 1, wherein the live output plate comprises a recess for accommodating the second insulating member.

7. The capacitor header as claimed in claim 1, wherein an outer dimension of the first insulating member is less than or equal to an inner dimension of the ground output plate.

8. The capacitor header as claimed in claim 1, wherein an outer dimension of the second insulating member is greater than an inner dimension of the ground output plate.

9. The capacitor header as claimed in claim 1, wherein the non-planar mating surface of the first insulating member is complementary to the non-planar mating surface of the second insulating member.

10. The capacitor header as claimed in claim 1, wherein the non-planar mating surfaces each comprise one or more interleaving projections and recesses, wherein the one or more interleaving projections and recesses extend substantially perpendicularly to the path between the ground output plate and the apertures in the first and second insulating members.

11. The capacitor header as claimed in claim 1, wherein the non-planar mating surfaces comprise one or more projecting walls and recessed channels that are azimuthally extended.

12. The capacitor header as claimed in claim 11, wherein the at least one insulating seal is positioned between the one or more projecting walls and recessed channels of the non-planar mating surfaces.

13. The capacitor header as claimed in claim 1, wherein the non-planar mating surfaces comprise a stepped cross section.

14. The capacitor header as claimed in claim 1, wherein the capacitor header comprises a plurality of insulating seals, and wherein one of the plurality of insulating seals closer to the ground output plate has a thickness that is greater than a thickness of another of the plurality of insulating seals closer to the apertures of the first and second insulating members.

15. The capacitor header as claimed in claim 1, wherein the first set of one or more insulating sheets extends between the first insulating member and the second insulating member.

16. The capacitor header as claimed in claim 1, wherein an inner dimension of the first set of one or more insulating sheets is less than an inner dimension of the ground output plate and/or less than an outer dimension of the first insulating member.

17. The capacitor header as claimed in claim 1, wherein an inner dimension of the second set of one or more insulating sheets is approximately equal to an inner dimension of the second insulating member and/or is less than an inner dimension of the ground output plate.

18. The capacitor header as claimed in claim 1, wherein the capacitor header comprises an additional insulating seal between the second insulating member and the live output plate.

19. The capacitor header as claimed in claim 18, wherein the second insulating member comprises a recess for accommodating the additional insulating seal.

20. A capacitor for storing electrical charge, wherein the capacitor comprises:
    an outer ground conductor;
    a central live conductor; and
    a capacitor header for coupling a voltage output from the capacitor, wherein the capacitor header comprises:
        a live output plate electrically connected to the central live conductor;
        a ground output plate electrically connected to the ground conductor, the ground output plate comprising an aperture through which the central live conductor or a connector between the central live conductor and the live output plate extends;
        a first insulating member and a second insulating member each arranged at least partly within the aperture of the ground output plate, wherein each of the first insulating member and the second insulating member comprises an aperture through which the central live conductor or a connector between the central live conductor and the live output plate extends, wherein the each of the first insulating member and the second insulating member comprises a non-planar mating surface, wherein the non-planar mating surfaces of the first insulating member and the second insulating member interleave each other to form a non-linear path between the ground output plate and the apertures in the first insulating member and the second insulating member;
at least one insulating seal between the non-planar mating surfaces of the first insulating member and the second insulating member;
    a first set of one or more insulating sheets between the ground output plate and the second insulating member; and
    a second set of one or more insulating sheets between the live output plate and the second insulating member;
    wherein the first set of one or more insulating sheets and the second set of one or more insulating sheets extend beyond an outer perimeter of the live output plate and the ground output plate.

* * * * *